United States Patent

Flint

[15] 3,698,795

[45] Oct. 17, 1972

[54] DIFFRACTION GRATING WITH TWO DIFFRACTING SURFACES

[72] Inventor: Bruce K. Flint, Lancaster, Mass.

[73] Assignee: Acton Research Corporation, Acton, Mass.

[22] Filed: Jan. 26, 1971

[21] Appl. No.: 109,861

[52] U.S. Cl..............................350/162 R, 356/101
[51] Int. Cl................................................G02b 5/18
[58] Field of Search......350/162 R; 356/99, 100, 101

[56] References Cited

UNITED STATES PATENTS

| | | | |
|---|---|---|---|
| 2,313,489 | 3/1943 | Latrobe............350/162 R UX |
| 2,670,652 | 3/1954 | Sherman....................356/101 |
| 2,464,738 | 3/1949 | White et al.........350/162 R X |
| 3,516,730 | 6/1970 | Wood....................350/162 R |

FOREIGN PATENTS OR APPLICATIONS

| | | | |
|---|---|---|---|
| 817,051 | 7/1959 | Great Britain.........350/162 R |

Primary Examiner—John K. Corbin
Attorney—James H. Grover

[57] ABSTRACT

A spectral dispersion reflective grating comprises a vacuum deposited metal film with straight, parallel grooves. The film is of a thickness such that it is opaque and both its surfaces are substantially identical. The film is supported on a glassy blank or frame which permits light to be transmitted to, and reflectively diffracted from, either or both of the film surfaces. Elements on the support detachably engage a grating in the mount for use of either grooved film surface or for simultaneous use in a double monochromator. The support elements define a plane parallel to the film plane insuring that in reversible or scanning use both film surfaces will maintain a desired relation in a scanning or reversible spectrometric system. When the two film surfaces are on a single glassy blank or contained between light transmissive glassy blanks of different refractive indices, different blaze wavelengths appear outside the blanks at each side of the grating without changing the spectral dispersion.

25 Claims, 7 Drawing Figures

PATENTED OCT 17 1972  3,698,795

INVENTOR
BRUCE K. FLINT
BY James K. Grover
ATTY

DIFFRACTION GRATING WITH TWO DIFFRACTING SURFACES

BACKGROUND OF THE INVENTION

Precision optical dispersion instruments such as spectrometers, spectrographs, monochromators and the like for precise production and measurement of light spectra use a straight grooved grating for dispersing light from a source in spectra wherein discrete wavelengths are disposed along a dispersion plane in spectral order, that is, in order of ascending wavelength from the vacuum ultraviolet to the far infrared. Most modern gratings for such precision spectrometric instruments are made by depositing thin films of aluminum or gold on a machine ruled glassy master and then transferring and adhering the film to a permanent support as shown in U.S. Pat. No. 2,464,738, issued Mar. 15, 1949 to J.U. White et al. Plastic blanks in which the rulings have been impressed by a die before coating are so inferior in optical grade as to be practically useless in spectrometric measurements.

Spectrometric transfer gratings of optical quality are extremely expensive, ranging from hundreds to thousands of dollars a grating. Damage by accumulation of contaminants on exposed grooved surface of the grating results in a costly loss. In some two-dispersion instruments, such as double monochromators, two gratings are required, doubling the grating cost, and imposing great care and expense in matching and alignment of the two gratings.

Also, in many instances there is a requirement in one instrument for measurement of different wavelength regions of the spectrum. To examine particular wavelength regions, the grating may be blazed, that is the major faces of it are formed at approximately one half the dispersion angle of the particular wavelengths. With blazing, most of the energy will be dispersed from the grating at the desired wavelengths. However, a grating blazed for particular wavelengths disperses low energy at other wavelengths and is limited in use for examination of other wavelengths.

Thus, one object of the present invention is to reduce the cost of a grating by increasing its useful life. Another object is to reduce cost by providing a single grating replacing the two gratings in systems such as double monochromators. A still further object is to provide a single grating effective at two different blaze wavelengths without altering the spectral dispersion.

SUMMARY OF THE INVENTION

According to the invention a grating for diffraction of predetermined wavelengths in a spectral dispersion instrument a new article of commerce comprises a reflection grating including a thin reflective film of thickness opaque to said predetermined wavelengths and corrugated in cross section so that the same straight, parallel grooves appear at both surfaces of the film, and a glassy substrate attached to one surface of and supporting said film, said substrate being optically polished, flat and clear with plane-parallel surfaces, said grating being specially adapted for transmission of said light traveling through said substrate to said film for reflective dispersion of light spectra from said film through said substrate. Such a grating may be reversed in its mount if one surface becomes unusable, or both surfaces may be used simultaneously in a two dispersion system. Moreover, if the support means comprises a glassy transparent plate over one surface of the ruled film providing a material of different index of refraction over that one surface than over the other surface, different blaze wavelengths are dispersed at the two sides of the grating.

Further according to the invention an optical instrument for precise spectral dispersion of predetermined wavelengths of light comprises a grating including a thin reflective film of thickness opaque to said predetermined wavelengths and corrugated in cross section so that the same straight, parallel grooves appear at both surfaces of the film, and a glassy substrate attached to one surface of and supporting said film, said substrate being optically polished, flat and clear with plane-parallel surfaces, means for directing light on one surface of said film through said substrate, and means utilizing the spectra dispersed from said film through said substrate.

Still further according to the invention a method of precise spectral dispersion of predetermined wavelengths of light from a reflective, grooved film mounted on an optically transmissive grating substrate which comprises directing light on said film through said substrate and analyzing the spectra dispersed from said film through said substrate.

For the purpose of illustration a typical embodiment of the invention is shown in the accompanying drawing in which FIG. 1 is a schematic showing of a double monochromator embodying a grating according to the invention;

Figure 1:
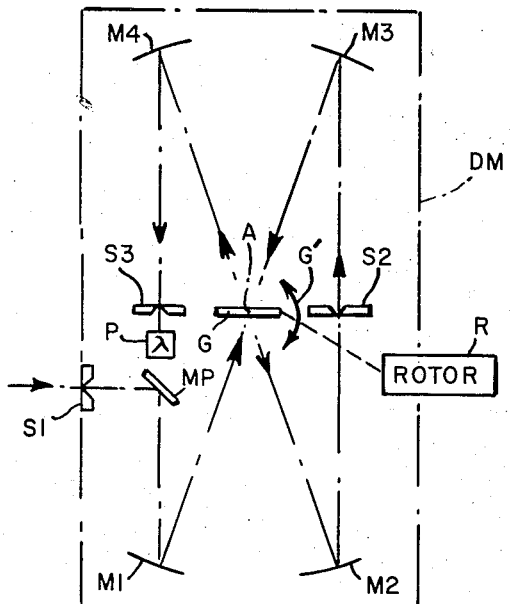

Shown in FIG. 1 by way of example and not claimed as a part of the present invention is a double monochromator whose frame or base is designated DM. In the direction of the arrows a source light beam passes through an entrance slit S1 to a 45 degree plane mirror MP which reflects diverging light rays to a curved collimating mirror M1. The collimator M1 reflects parallel light rays onto one grooved surface of a reflective diffraction grating G. Thence it is dispersed in spectra to a curved mirror M2 which focuses the spectra in a plane passing through an intermediate slit S2. The narrow band of the spectrum passing through the intermediate slit S2 is collimated by a curved mirror M3 upon the other grooved surface of the grating G, whence it is further dispersed and focused by a curved mirror M4 upon an exit slit S3. Beyond the exit slit a photodetector P detects the twice dispersed beam. As will be explained in greater detail the grating G is mounted to pivot about an axis A as indicated by the double headed arrow G′, when driven by a rotor R which may be a manual adjustment or a motor driven scanning mechanism.

Figure 2:
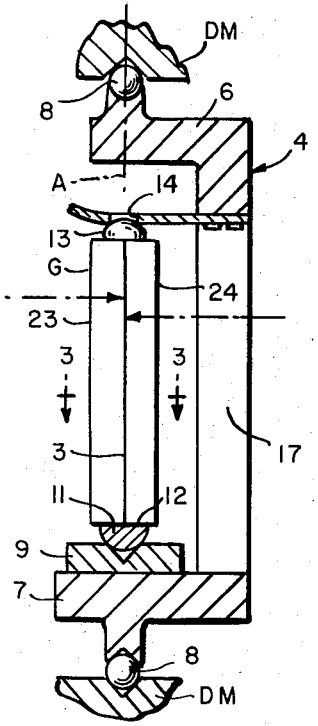
FIG. 2 is a side elevation, partly in section, of the grating in a pivotal mount.

The grating G shown in side elevation in FIG. 2 generally comprises two glassy blanks or substrates 23 and 24 and an intermediate thin film 3 lying in a vertical plane passing through the pivot axis A and normal to the plane of FIG. 2. As appears more clearly in the enlarged section of FIG. 3 the film 3 has vertical grooves parallel to the pivot axis A. The mount comprises a yoke 4 having upper and lower arms 6 and 7 supported by ball bearings 8 on the frame or base DM of the double monochromator. On the lower yoke arm is a rectangular block 9 having a V-groove 11 extending along the lower edge of the grating G. A half round cylindrical bar 12 cemented to the lower edge of the grating makes line contacts with the edges of the V-groove. A ball end piece 13 cemented to the top edge of the grating snaps into a circular opening 14 of a leaf spring detent 16 secured to the yoke to secure the grating in the mounting yoke 4. The yoke 4 exposes the left face of the grating G, and has an opening 17 exposing the right face of the grating. The bearings 8, opening 14 and V-groove 11 define a single vertical reference plane through which the axis A passes. As shown in FIG. 2 the film 3 and the axes of the ball end 13 and half round bar 12 lie in the reference plane, although in some spectrometric applications it is possible to offset the film 3 in a plane spaced from but parallel to the reference plane.

Figures 3, 4:
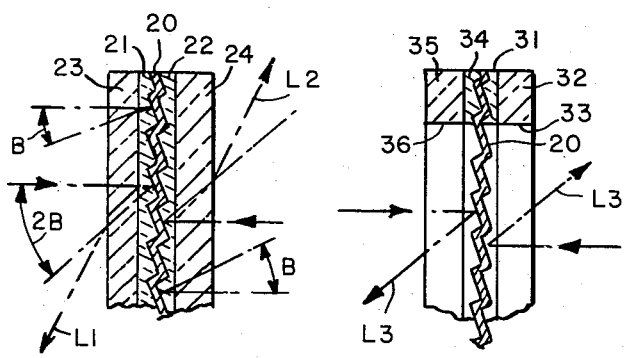
FIG. 3 is an enlarged section of the grating on line 3—3 of FIG. 2.
FIG. 4 is a section like FIG. 3 of another form of grating.
Figure 7:
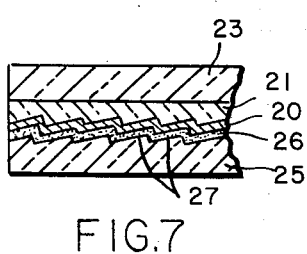

As mentioned above, the grating G has vertical grooves which appear in FIG. 3 greatly exaggerated as a zigzag or corrugated metallic film 20 adhered by cement layers 21 and 22 between glassy blanks or plates 23 and 24. By way of example the film of FIGS. 2 and 3 is made, as shown in FIG. 7, by vacuum deposition of aluminum or gold upon a precision ruled glassy master 25 having an extremely thin layer of parting agent 26 over the grooves 27 of its ruled surface. The film 20 is deposited to a thickness just enough to render it opaque to the light to be dispersed. Typically the thickness is in the order of 0.1 micron being somewhat thicker for use with ultraviolet light or for groove depths at the upper end of a range of 0.02 to 6 microns. Within these approximate parameters the film will be deposited with a thickness of the same order as the groove depth, and will be in corrugated from with substantially identical grooves appearing on both surfaces of the film.

A layer of cement 21 such as light transmitting epoxy is then applied to the exposed film surface and the first glassy plate 23 is adhered to the film. The plate 23 and the now transferred film 20 are then lifted from the master 25, release of the film from the master being effected by the coat of parting agent 26. The second glassy plate 24 is then adhered to the other film surface by the cement layer 22. Each glassy plate should be highly light transmissive or transparent. A suitable plate or blank meeting such optical standards is optically flat to within 2 wavelengths or better; its sides are plane-parallel to within 3 wavelengths; its exposed side has a roughness less than 35 Angstroms, equivalent to a MIL Spec. 0-13830 surface quality of 20-10; the glass quality or clarity is with not more than one inclusion per cubic centimeter, with a maximum inclusion diameter of 0.020 inches. Quartz may be used for vacuum UV spectrometry. The cement layers should be also highly transparent and of approximately the same refractive index.

The grating formed according to the above example with two substantially identical grooved surfaces enclosed in a highly transparent support will disperse light in spectral order with the highest spectrometric precision, the dispersion from both surfaces being substantially identical. The need for exactly matching the two dispersions of the double monochromator of FIG. 1 is met at the cost of forming only one film. Since the same film is used for both dispersions the need for parallelizing two separate films is eliminated.

It has been further been discovered that the refractive characteristic of the glassy plates 23 and 24 alter the effective blaze angle of the film grooves without altering their dispersion. In FIG. 3 the major surface of each groove is blazed or inclined at an angle B to the plane of the film so as to disperse light predominantly at a wavelength diffracted from the film at twice the blaze angle. If the glassy plates 23 and 24 of FIG. 2 are of materials having different refractive indices, although the blaze angle B is the same on both film surfaces, the blaze wavelengths L1 and L2 dispersed outside the glassy plates will be effectively different. The same effect can be accomplished by omitting the second glassy plate 24 and cement layer 22 exposing the right film surface to light for dispersion without refraction, while light dispersed through glassy plate 23 has its blaze wavelength effectively altered.

The grating of FIG. 3 is also useful in single dispersion systems as compared to the two dispersion system of FIG. 1. For example, the grating mount 4 of FIG. 2 is useful in a single monochromator, and is of the type which permits interchanging of gratings without adjustment. That is, the grating may be snapped in or out of mount 4 manually, the spring detent opening 14 and V-groove 11 precisely aligning the grating at each interchange. In a single dispersion system using only one side of the grating at a time, the grating may be reversed to change the effective blaze angle or to present a better grooved surface in the event that one surface has become defective.

Figure 5:
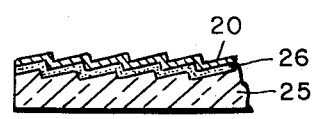
FIGS. 5 to 7 are sections like FIG. 3 showing methods of making gratings.
Figure 6:
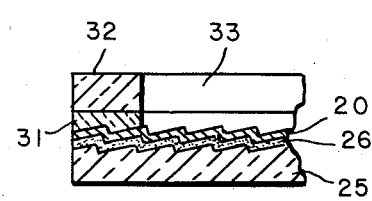

FIGS. 4 to 6 show a method of making a two surface grating particularly useful for dispersion of wavelengths absorbed by glassy supports. In FIG. 5, a thin metal film 20 is vacuum deposited on a ruled glassy master 25 having a parting agent layer 26 as described with respect to FIG. 7. The master may be circular or rectangular. As shown in FIG. 6, cement 31 is applied only around the peripheral margin of the deposited film, and an annular glassy frame 32 with an opening 33 is adhered to the film only at its margin. The film is then transferred from the master 25 and a similar frame 35 with an opening 36 is adhered to the other side of the film by cement 34 as shown in FIG. 4. Both surfaces of the film 20 are now exposed directly to the ambient atmosphere, which may in some instances be an inert gas or a near vacuum. As appears in FIG. 4 both film surfaces are exposed for identical dispersion of incident light at the same blaze wavelength L3. As with the grating of FIG. 3, the two diffractive surfaces of the frame mounted film 20 of FIG. 4 may be used alternatively in single dispersions or simultaneously in two dispersion systems.

With each of the gratings described two diffractive surfaces are provided substantially at the cost of one, a significant saving with optical grade spectrometric gratings priced in hundreds or thousands of dollars. Not only are the two surfaces perfectly matched dispersively, but also, lying substantially in the same plane, they are perfectly aligned for interchangeable mounts and double dispersion systems. The refractive support of FIG. 3 additionally allows one grating to disperse different effective blaze wavelengths greatly extending the useful spectral range of the gratings. The frame support of FIG. 4 additionally permits use at wavelengths absorbed by refractive media.

It should be understood that the present disclosure is for the purpose of illustration only and that this invention includes all modifications and equivalents which fall within the scope of the appended claims. The grating may be made by methods not involving adhesive transfer, such as photographic methods.

I claim:

1. A diffraction grating for spectrometric dispersion of light of predetermined wavelengths in spectral order in a dispersion plane comprising:
   a thin reflective film of thickness opaque to said predetermined wavelengths and corrugated in cross section so that the same straight, parallel grooves appear at both surfaces, and
   support means holding said film in planar form, the support allowing transmission of light of said predetermined wavelengths on paths incident to both of said film surfaces, said film being reflectively diffractive of substantially identically dispersed spectra in precise spectral order and highest spectrometric precision from each of the two surfaces of the film, and said support being transmissive of at least one of the identical spectra with unaltered precision of dispersion.

2. A grating according to claim 1 wherein said support means comprises mounting elements defining a plane parallel to the plane of said film.

3. A grating according to claim 1 wherein said support means comprises a rigid, optically transparent substrate, the film being bonded to the substrate at one surface of the film.

4. A grating according to claim 3 further characterized by a second optically transparent substrate bonded to the other surface of the film.

5. A grating according to claim 4 wherein the substrate provides a medium at said one surface of different refractive index than at the other surface.

6. A grating according to claim 4 wherein the film grooves are blazed for predominant diffraction of a predetermined wavelength, and the second substrate is of material having a different index of refraction than the first said substrate, thereby to alter the blaze wavelength from said other film surface.

7. A grating according to claim 3 wherein the substrate provides a medium at said one surface of different refractive index than at the other surface.

8. A grating according to claim 1 wherein said film is supported only at its edges by a frame exposing both film surfaces to ambient atmosphere.

9. A grating according to claim 1 in combination with a spectral dispersion system comprising means for directing incident light on one side of a dispersing plane, means for focusing light dispersed from said plane on a dispersion plane, and means mounting said grating with said film in said dispersion plane, said mounting means holding said grating with either surface of said grooved film facing said light directing means.

10. A grating according to claim 9 wherein said grating comprises mounting elements engaging said mounting means and defining a reference plane coincident with the plane of the film.

11. A grating according to claim 10 wherein said mounting means comprises means pivotally supporting the mounting means for rotation about an axis in said reference and film planes.

12. A grating according to claim 11 wherein the grooves of said film are parallel to said axis.

13. A grating according to claim 9 characterized by second means for directing incident light on the other film surface.

14. A grating according to claim 13 wherein the film grooves are blazed for predominant diffraction of a predetermined wavelength and said film support means comprises at least one optically transparent substrate on one surface of the film providing a medium at one surface of the film of different refractive index than at the other film surface.

15. A grating according to claim 1 in combination with a spectral dispersion system comprising means pivotally mounting said grating for rotation on an axis lying in said film plane parallel to the grooves of the film, and means for directing light on both surfaces of the film.

16. A grating according to claim 15 wherein said grating comprises mounting elements engaging said mounting means and defining a reference plane coincident with the plane of the film.

17. A grating according to claim 15 wherein the film grooves are blazed for predominant diffraction of a predetermined wavelength and said film support means comprises at least one optically transparent substrate on one surface of the film providing a medium at one surface of the film of different refractive index than at the other film surface thereby to alter the effective blaze wavelength from said other film surface.

18. A grating according to claim 1 in combination with a mount pivoting the grating on an axis lying in the plane of the film parallel to the grooves of the film.

19. A grating according to claim 1 wherein said support means comprises a glassy substrate supporting the film on one surface and having a second surface parallel to the first within 3 wavelengths.

20. A grating according to claim 19 wherein said second surface is optically flat within 2 wavelengths.

21. A diffraction grating for spectrometric dispersion of predetermined wavelengths of light in a dispersion plance comprising:
   a thin reflective metallic film of thickness effectively opaque to said predetermined light wavelengths with corrugations forming substantially identical grooves on both surfaces of the film, both said grooved surfaces having the characteristic of diffracting substantially identically dispersed spectra in a dispersion plane and being identically blazed for predominant diffraction of a predetermined wavelength, one of said grooved surfaces being exposed to ambient atmosphere for non-refractive diffraction therefrom, and
   a glassy support bonded to the other surface of the film, the support being transmissive of said light wavelengths to said one surface and being of sufficient optical quality to allow useful diffraction of spectra with highest spectrometric precision from the back side of the film, thereby altering the blaze wavelength from said other film surface without altering the spectral dispersion.

22. A diffraction grating for spectrometric dispersion of predetermined wavelengths of light in a dispersion plane comprising:

a thin reflective metallic film of thickness effectively opaque to said predetermined light wavelengths with corrugations forming substantially identical grooves on both surfaces of the film, both said grooved surfaces having the characteristic of diffracting substantially identical spectra in a dispersion plane, and glassy supports bonded to respective surfaces of the film, each support being transmissive of said light wavelengths to its respective grooved surface, and being of sufficient optical quality to allow useful diffraction of spectra with highest spectrometric precision from each grooved surface.

23. A diffraction grating for spectrometric dispersion of predetermined wavelengths of light in dispersion plane comprising: a dispersion plane, and a thin reflective metallic film of thickness effectively opaque to said predetermined light wavelengths with corrugations forming substantially identical grooves on both surfaces of the film, both said grooved surfaces having the characteristic of diffracting substantially identical spectra with highest spectrometric precision in A DISPERSION PLANE, AND support means attached to at least one of said grooved surfaces at the margin thereof leaving a major area of both said surfaces exposed to ambient atmosphere.

24. For diffraction of predetermined wavelengths in a spectral dispersion instrument a new article of commerce comprising a reflection grating including a thin reflective film of thickness opaque to said predetermined wavelengths and corrugated in cross section so that the same straight, parallel grooves appear at both surfaces of the film, and a glassy substrate attached to one surface of and supporting said film, said substrate being optically polished, flat and clear with plane-parallel surfaces, said grating being diffractive from both sides of said film with highest spectrometric precision and being specially adapted for transmission of said light traveling through said substrate to said film for reflective dispersion of light spectra from said film through said substrate.

25. An optical instrument for precision spectral dispersion of predetermined wavelengths of light comprising:

a grating including a thin reflective film of thickness opaque to said predetermined wavelengths and corrugated in cross section so that the same straight, parallel grooves appear at both surfaces of the film, and a glassy substrate attached to one surface of and supporting said film, said substrate being optically polished, flat and clear with plane-parallel surfaces, and means for directing light on one surface of film through said substrate, said grating being diffractive from both sides of said film with highest spectrometric precision.

* * * * *